United States Patent [19]

Gray et al.

[11] Patent Number: 5,563,754
[45] Date of Patent: Oct. 8, 1996

[54] THIN FILM MAGNETIC HEAD INCLUDING A DURABLE WEAR LAYER AND GAP STRUCTURE

[75] Inventors: G. Robert Gray, Fremont; Arun Malhotra, San Jose, both of Calif.

[73] Assignee: AIWA Research and Development, Inc., Fremont, Calif.

[21] Appl. No.: 296,840

[22] Filed: Aug. 26, 1994

[51] Int. Cl.$^6$ .................................................. G11B 5/42
[52] U.S. Cl. ............................................................ 360/126
[58] Field of Search ............................................... 360/126

[56] References Cited

U.S. PATENT DOCUMENTS

| | | | |
|---|---|---|---|
| 3,723,665 | 3/1973 | Lazzari et al. | 179/100.2 C |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,503,439 | 3/1985 | Springer | 346/74.5 |
| 4,503,440 | 3/1985 | Springer | 346/74.5 |
| 4,517,616 | 5/1985 | Bischoff | 360/126 |
| 4,539,280 | 9/1985 | Springer | 430/39 |
| 4,544,421 | 10/1985 | Springer | 148/103 |
| 4,639,289 | 1/1987 | Lazzari | 156/643 |
| 4,809,103 | 2/1989 | Lazzari | 360/103 |
| 4,837,924 | 6/1989 | Lazzari | 29/603 |
| 4,901,177 | 2/1990 | Lazzari | 360/113 |
| 4,912,584 | 3/1990 | Mallary et al. | 360/126 |
| 4,942,490 | 7/1990 | Lehureau | 360/126 |
| 4,949,207 | 8/1990 | Lazzari | 360/119 |
| 4,970,615 | 11/1990 | Gau | 360/122 |
| 4,984,118 | 1/1991 | Springer | 360/125 |
| 4,992,897 | 2/1991 | Deroux-Dauphin | 360/103 |
| 5,020,212 | 6/1991 | Michijima et al. | 29/603 |
| 5,041,932 | 8/1991 | Hamilton | 360/104 |
| 5,065,271 | 11/1991 | Matsuura et al. | 360/126 |
| 5,073,242 | 12/1991 | Hamilton | 204/192.22 |
| 5,090,111 | 2/1992 | Lazzari | 360/119 X |
| 5,111,351 | 5/1992 | Hamilton | 360/104 |
| 5,163,218 | 11/1992 | Hamilton | 29/603 |
| 5,166,845 | 11/1992 | Thompson et al. | 360/103 |
| 5,168,408 | 12/1992 | Lazzari | 360/113 |
| 5,175,658 | 12/1992 | Chang et al. | 360/103 |
| 5,189,580 | 2/1993 | Pisharody et al. | 360/126 |
| 5,195,006 | 3/1993 | Morikawa | 360/126 |
| 5,196,976 | 3/1993 | Lazzari | 360/113 |
| 5,198,948 | 3/1993 | Stover et al. | 360/124 |
| 5,202,863 | 4/1993 | Miyatake et al. | 369/13 |
| 5,208,716 | 5/1993 | Lazzari | 360/113 |
| 5,216,559 | 6/1993 | Springer | 360/106 |
| 5,224,260 | 7/1993 | Fedeli et al. | 29/603 |
| 5,260,845 | 11/1993 | Takayama et al. | 360/103 |
| 5,266,409 | 11/1993 | Schmidt et al. | 428/446 |
| 5,271,802 | 12/1993 | Chang et al. | 29/603 X |
| 5,274,521 | 12/1993 | Miyauchi et al. | 360/119 |

OTHER PUBLICATIONS

A. Sano, M. Egawa, M. Nitta, K. Takayanagi, T. Matsushita, and T. Fujita, A Low Inductance Metal–In–Gap Head Using a Side–Core Concept, ©1993, IEEE Transactions on Magnetics, vol. 29, No. 6, pp. 3888–3890.

K. L. Mittal, Factors Affecting Adhesion of Lithographic Materials, Solid State Tehnology, May 1979, pp. 89–100.

J. P. Lazzari and P. Deroux–Dauphin, A New Thin Film Head Generation IC Head, IEEE Transactions on Magnetics, vol. 25, No. 5, Sep. 1989, pp. 3173–3193.

*Primary Examiner*—John H. Wolff
*Attorney, Agent, or Firm*—Skjerven, Morrill, MacPherson, Franklin & Friel

[57] ABSTRACT

A thin film magnetic head is provided in which a magnetic yoke assembly is built up, layer by layer, atop a substrate using semiconductor thin film techniques. A lower yoke assembly is first fabricated including a lower magnetic layer situated on the substrate and first and second side poles built up vertically from the ends of the lower magnetic layer. An insulative pedestal surrounded by a frame is formed at the top of the lower yoke assembly and extends above the uppermost lateral plane of the yoke assembly. A diamond-like carbon (DLC) wear layer is deposited atop the pedestal. First and second pole wells are excavated in the DLC layer so as to expose the first and second side poles therebelow and to form a DLC gap region between the first and second side poles. First and second magnetic poles are then formed in the first and second pole wells, respectively.

12 Claims, 7 Drawing Sheets

THIN FILM MAGNETIC HEAD INCLUDING A DURABLE WEAR LAYER AND GAP STRUCTURE

CROSS REFERENCE TO RELATED PATENT APPLICATIONS

This patent application is related to the copending patent application entitled "METHOD OF FABRICATING A THIN FILM MAGNETIC HEAD INCLUDING LAYERED MAGNETIC SIDE POLES", patent application Ser. No. 08/297,186 by Malhotra et al., filed concurrently herewith and assigned to the same assignee, the disclosure of which is incorporated herein by reference.

BACKGROUND OF THE INVENTION

1. Field of the Invention

This invention relates in general to magnetic recording and playback heads and, more particularly, to thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

Unfortunately, thin film magnetic heads are subject to substantial wear when the head contacts magnetic recording media such as tape, for example. Over time, this wear can be very considerable and ultimately may be a cause for head failure if accumulated wear significantly damages the head.

SUMMARY OF THE INVENTION

One advantage of the thin film head of the present invention is significantly reduced head wear.

Another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

In accordance with one embodiment of the present invention, a thin film magnetic head is provided which includes a substrate and a lower pole member of magnetic material situated on the substrate. The lower pole member includes first and second ends. The thin film head also includes first and second side pole members of magnetic material situated at the first and second ends, respectively, of the lower pole member. The first and second side pole members are built up from a plurality of layers of magnetic material deposited layer upon layer. The first and second side pole members each include a top and a bottom. The thin film head further includes a conductor coil situated around one of the first and second side pole members. The conductor coil is separated from the first and second side pole members by insulative layers. An insulative pedestal is situated at the tops of the first and second side pole members. The insulative pedestal extends above the plane of the insulative layers below and surrounds the tops of the first and second side pole members. The head also includes a diamond-like carbon (DLC) layer situated on the insulative pedestal. The DLC layer includes first and second pole wells which are open to the tops of the first and second side pole members below, the first and second pole wells being laterally spaced apart to form a DLC gap region between the first and second pole wells. First and second magnetic poles are situated in the first and second pole wells, respectively.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 2A:
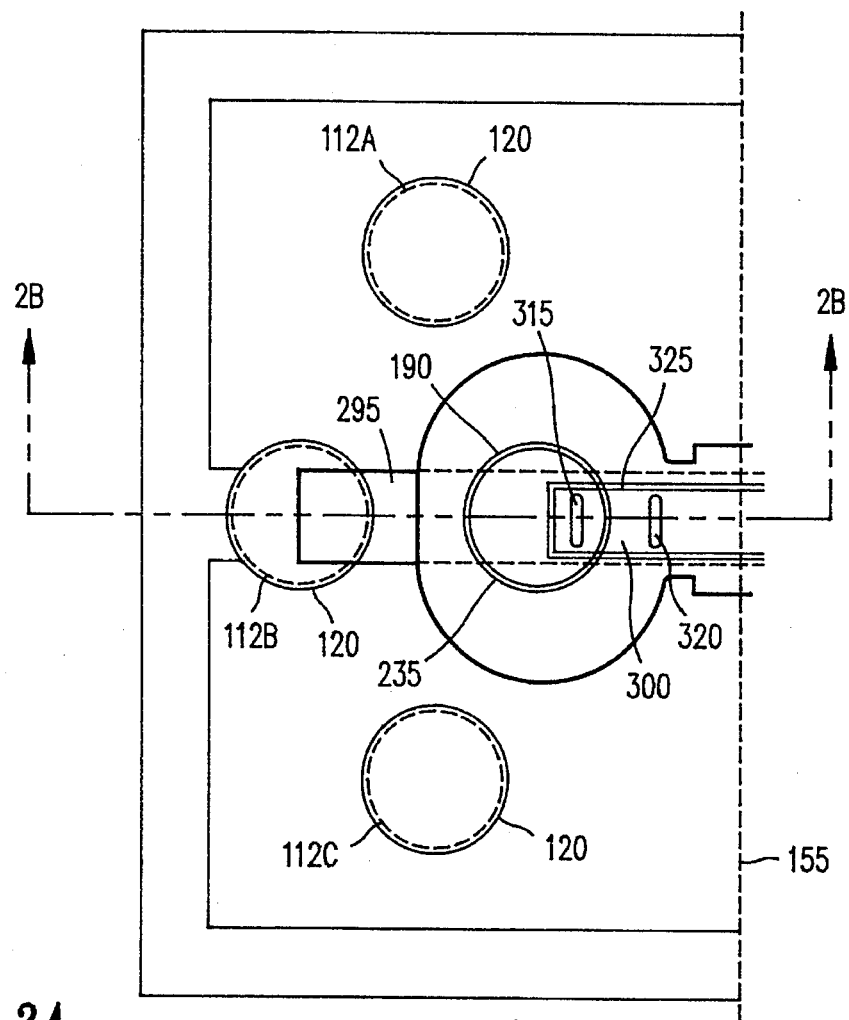
FIG. 2A is a top plan view of one embodiment of the thin film magnetic head of the present invention prior to completion of the pole structure.
Figure 2B:
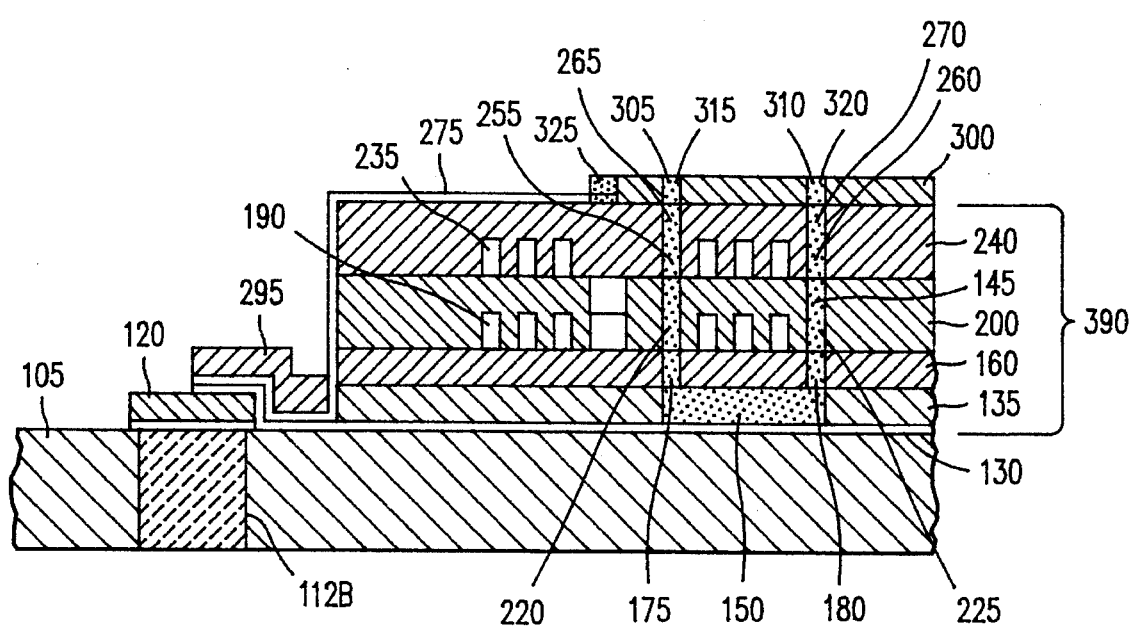
FIG. 2B is a cross-sectional view of the thin film head of FIG. 2A taking along section line 2B—2B.

FIG. 2A illustrates a top plan view of a partially complete thin film head 100 which is fabricated as described in detail in the copending patent application entitled "THIN FILM MAGNETIC HEAD INCLUDING LAYERED MAGNETIC SIDE POLES" by Arun Malhotra, G. Robert Gray, James Watterston and Jane Ang, patent application Ser. No. 08/297,186, which is incorporated herein by reference, and which is filed concurrently with this document and assigned to the same assignee. FIG. 2B is a cross-sectional view of head 100 taken along a section line 2B—2B.

Thin film head 100 includes an alumina substrate 105 in which via holes are formed for receiving via connective members 112A, 112B and 112C. Via connective members 112A, 112B and 112C are covered by via caps 120 which protect the via connective members from etchants used in subsequent etching steps. Via connective member 112B connects to the ground of head 100. Via connective members 112A and 112C connect to respective ends of lower coil layer 190 and upper coil layer 235.

A magnetic yoke 145 is built up, layer by layer, on a seed layer 130 of conductive material disposed on the upper surface of substrate 105. One magnetic material which may be used as material for magnetic yoke 145 is nickel-iron (NiFe) or Permalloy material. Bottom magnetic layer 150 is plated in an opening in an insulative layer 135 which is situated atop seed layer 130. First magnetic side pole 265 is built up, layer by layer, at one end of bottom magnetic layer 150 while second magnetic side pole 270 is built up, layer by layer, at the other end of bottom magnetic layer 150 as shown in FIG. 2B. More specifically, each of the magnetic layers 175, 220, 255 and 315 which together form first side pole 265 are built up in open regions in respective insulative layers 160, 200, 240 and 300. Likewise, each of the magnetic layers 180, 225, 260 and 320 which together form second pole 270 are built up in open regions in respective insulative layers 160, 200, 240 and 300. Thus, magnetic yoke 145 is formed by bottom magnetic layer 150, magnetic layers 175, 220, 255, 315 and magnetic layers 180, 225, 260 and 320, all of which are plated using common seed layer 130 as an electrode. Insulative layers 135, 160, 200, 240 and 300 are preferably layers of cured photoresist.

Magnetic yoke 145 together with insulative layers 135, 160, 200 and 240, form a main body 390 from which insulative layer 300 protrudes or extends. Insulative layer 300 thus forms a pedestal and is alternatively referred to as pedestal 300 or protrusion 300.

Prior to formation of insulative pedestal 300, a chrome-copper seed layer 275 is sputter deposited on head 100. Seed layer 275 is then patterned and etched away in the area above the side pole structure to form an open region where insulative pedestal 300 is to be located as seen in FIG. 2B. More particularly, seed layer 275 is sputtered, patterned and chemically etched on the upper surface of head 100 to include an open region above the side pole structure. Seed layer 275 is formed by an adhesion layer of chromium (Cr) on the upper surface of head 100 followed by a layer of copper (Cu). The adhesion layer enhances the adherence of the copper portion of seed layer 275 to the upper surface of head 100.

The primary requirement in selection of the material for seed layer 275 is that seed layer 275 be chemically etchable without damage to the exposed magnetic material (NiFe). Copper is an example of a material that meets this requirement and is also used for the coil seed layers. Chrome is used as the adhesion layer for copper. It is noted that a titanium-tungsten seed layer (Ti 10%; W 90%) which wet etches easily can also be used for seed layer 275.

As used in this document, the term "patterning" will mean the formation of a particular layer by thin film techniques such that the layer exhibits a specified or predetermined pattern. For example, in one approach, a mask is placed over a photoresist layer and the resultant structure is exposed to ultraviolet light such that the exposed portions of photoresist become sensitized and are soluble in a developing solution. The exposed portions of photoresist are then washed away in the developing solution leaving the photoresist layer with a pattern.

Seed layer 275 acts as a seed for the subsequent plating of magnetic frame 325. One embodiment of head 100 includes a grounding strip 295 which couples via connective member 112B to magnetic yoke 145 by the electrically conductive path through seed layer 130. Grounding strip 295 and the corresponding via connective member 112B are omitted if grounding of head 100 is not desired in a particular application.

A frame 325 of magnetic material, for example NiFe, is patterned and plated around insulative pedestal 300 at the same time that magnetic side pole portions 315 and 320 are plated. Frame 325 exhibits a substantially rectangular shape in this particular embodiment and surrounds insulative pedestal 300 which forms the inner boundary of frame 325 as seen in FIG. 2A. After plating frame 325, the exposed chrome-copper seed layer 275 is etched away.

Figure 3A:
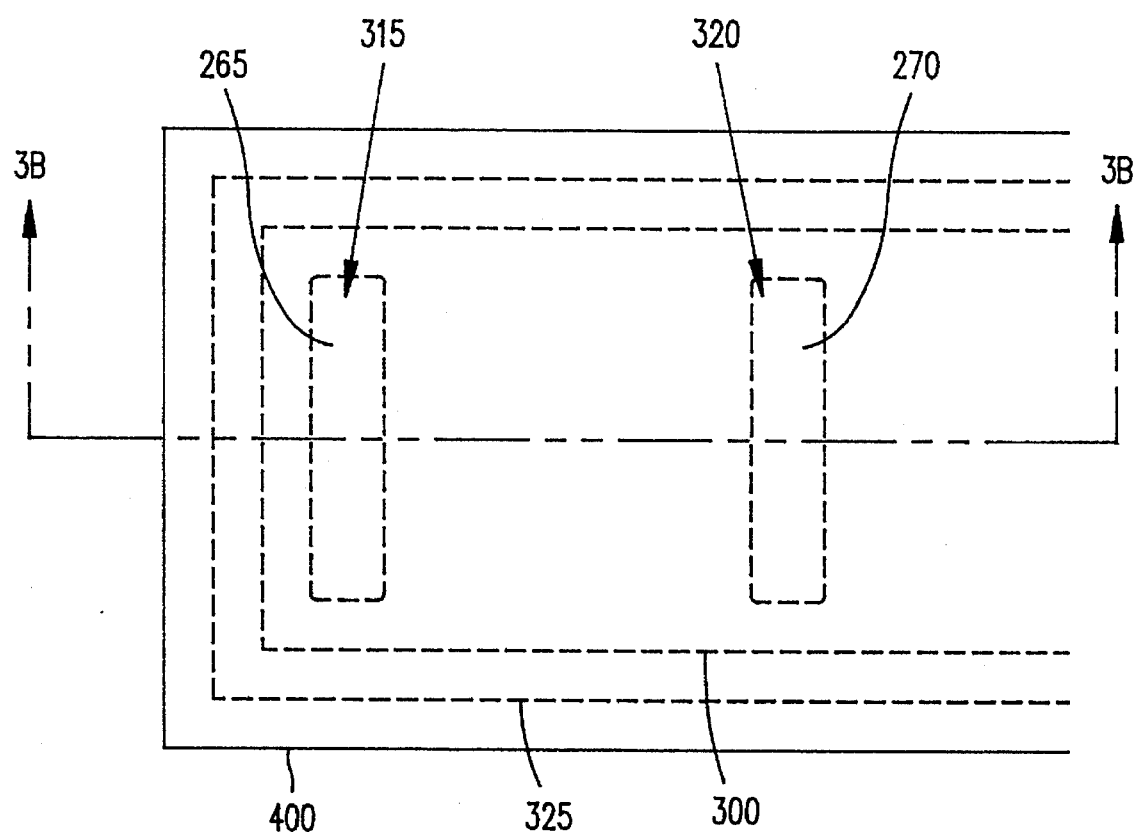
FIG. 3A is a close-up top plan view of the pole region of the thin film head of FIG. 2A after a lower diamond-like carbon (DLC) layer has been deposited on the head.

FIG. 3A is a top plan view of the side pole region of head 100 after a diamond-like carbon (DLC) wear layer 400 and associated intermediate layers are formed on the upper surface of head 100 of FIGS. 2A and 2B. Dashed lines are employed so that selected lower layers can be viewed. More particularly, magnetic side poles 315 and 320, insulative pedestal 300 and magnetic frame 325 are visible via dashed lines in FIG. 3A.

Before DLC wear layer 400 is deposited on the side pole region of head 100, the upper surface of the side pole region is prepared by sputtering a Cr—NiV seed layer 405 thereon. Seed layer 405 will be used later as the seed electrode for plating the magnetic poles of the head. However, seed layer 405 includes openings above magnetic side pole portions 315 and 320.

Figure 3B:
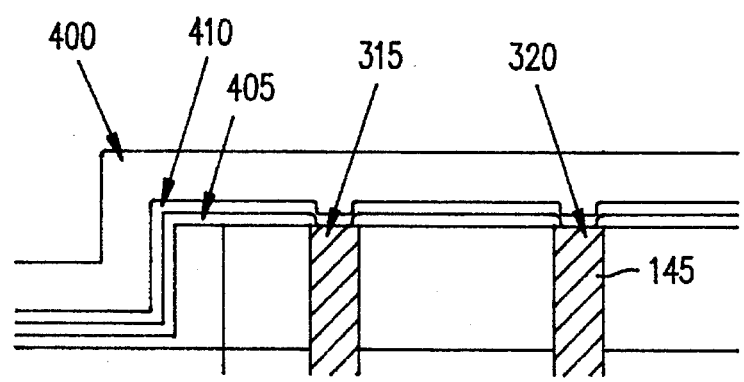
FIG. 3B is a cross-sectional view of the thin film head of FIG. 3A taking along section line 3B—3B.
Figure 4A:
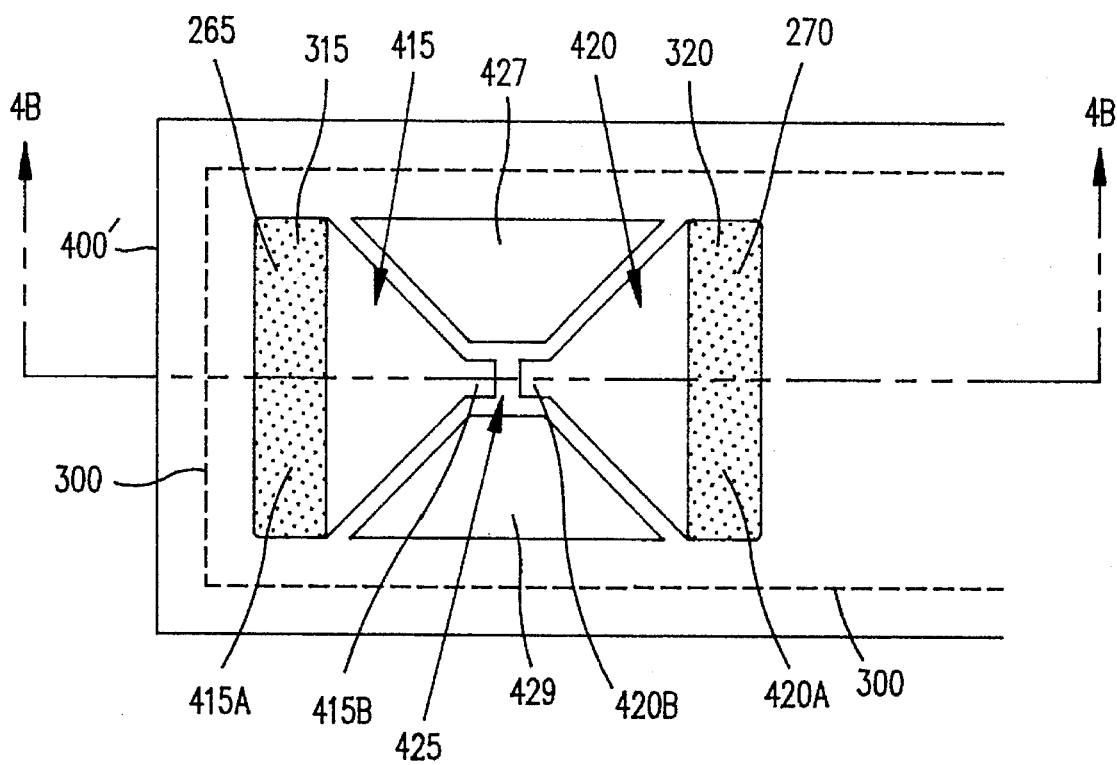
FIG. 4A is a top plan view of the head of FIG. 3A after first and second pole wells have been etched in the lower DLC layer to form a gap region.
Figure 4B:
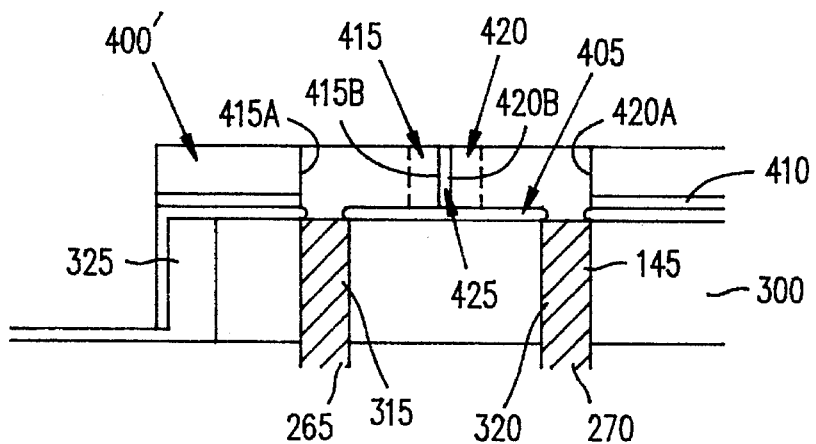
FIG. 4B is a cross-sectional view of the thin film head of FIG. 4A taking along section line 4B—4B.

To accomplish this end, a seed layer "lift-off process" is used. More particularly, in this "lift-off" process, photoresist (not shown) is patterned covering the tops of magnetic side pole portions 315 and 320 of FIG. 3A and 3B. Seed layer 405 is then sputtered on the entire upper surface of the partially completed head 100. The photo-resist which covers the tops of side pole portions 315 and 320 is now "lifted-off" head 100. To accomplish this lift-off, the partially complete head 100 is placed in an ultrasonic bath including a photoresist solvent such as acetone, for example. The seed layer 405 is sufficiently thin such that it does not cover the photoresist layer at the tops of side pole portions 315 and 320 very well. In this manner, there are sufficient avenues of attack by which the solvent can get through seed layer 130 at the edges of the tops of side pole portions 315 and 320 to dissolve the photoresist layer at the tops of side pole portions 315 and 320. When the photoresist layer at the tops of side pole portions 315 and 320 is thus dissolved, the portions of seed layer 130 immediately above the tops of side pole portions 315 and 320 lift-off and float away. The region of head 100 at the tops of side-pole portions 315 and 320 is thus void of seed layer 405 as shown in FIG. 3B.

A silicon layer 410 is sputtered on seed layer 405 to act as an adhesion layer for the subsequent deposition of DLC layer 400. DLC layer 400 is deposited on silicon adhesion layer 410 as seen in FIGS. 3A and 3B. Adhesion layer 410 enhances the adhesion of DLC layer 400 to the layers of head 100 below.

A more detailed discussion of the process for depositing DLC layer 400 is now provided. Before DLC protective wear layer 400 is actually laid down on silicon adhesion layer 410, adhesion layer 410 is sputter cleaned. In the course of performing this sputter cleaning, approximately 200 Å of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie. the energized electrode) of the SAMCO plasma machine, Model No. PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20–approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 A/min is obtained which is maintained until the desired DLC thickness is reached, namely approximately 5μ.

DLC fabricated in this manner results in a DLC layer 400 with a Knoop hardness of approximately 800. It is found that DLC layer Knoop hardnesses of greater than 700 up to approximately 2000 Knoop produce and acceptably hard layer 400 for wear protection purposes. DLC wear layer 400 is then reactive ion etched to form DLC wear layer 400'.

A thin (approximately 500 Å) masking layer (not shown) of metal such as Chromium is sputtered over DLC layer 400 and photo-patterned and etched to expose areas to be reactive ion etched. The exposed areas include the substantially rectangular area in which DLC frame 400' is located. DLC layer 400 is then reactive ion etched to form a DLC frame 400' which overlies the NiFe frame 325 and the side pole region therein.

As part of these patterning and reactive ion etching steps which form DLC frame 400', the masking layer is patterned and etched to form pole wells 415 and 420 which together exhibit a bow-tie like shape. Pole wells 415 and 420 are excavations in DLC wear layer 400' in which respective magnetic poles will be formed. Pole well 415 includes a wide end 415A and a narrow end 415B. Pole well 420 includes a wide end 420A and a narrow end 420B. Pole wells 415 and 420 are spaced apart to form a DLC gap region 425 between narrow end 415B and narrow end 420B. DLC gap region 425 is the portion of DLC layer 400' between narrow end 415B and narrow end 420B which remains unetched in the reactive ion etching step.

As part of the same reactive ion etching step, the portion of silicon adhesion layer 410 between side poles 265 and 270 is ion etched away to expose seed layer 405 to permit subsequent pole plating thereon. More specifically, silicon adhesion layer 410 is reactive ion etched in a 80–90% $CF_4$: 20–10% $O_2$ plasma. Also, the portion of silicon adhesion layer 410 outside of DLC frame 400' is reactive ion etched away. Additional magnetic control wells 427 and 429 are optionally excavated in DLC layer 400' by reactive ion etching at the same time that pole wells 415 and 420 are formed. The metal masking layer (not shown) remaining over DLC layer 400' is then etched away.

Figure 5A:
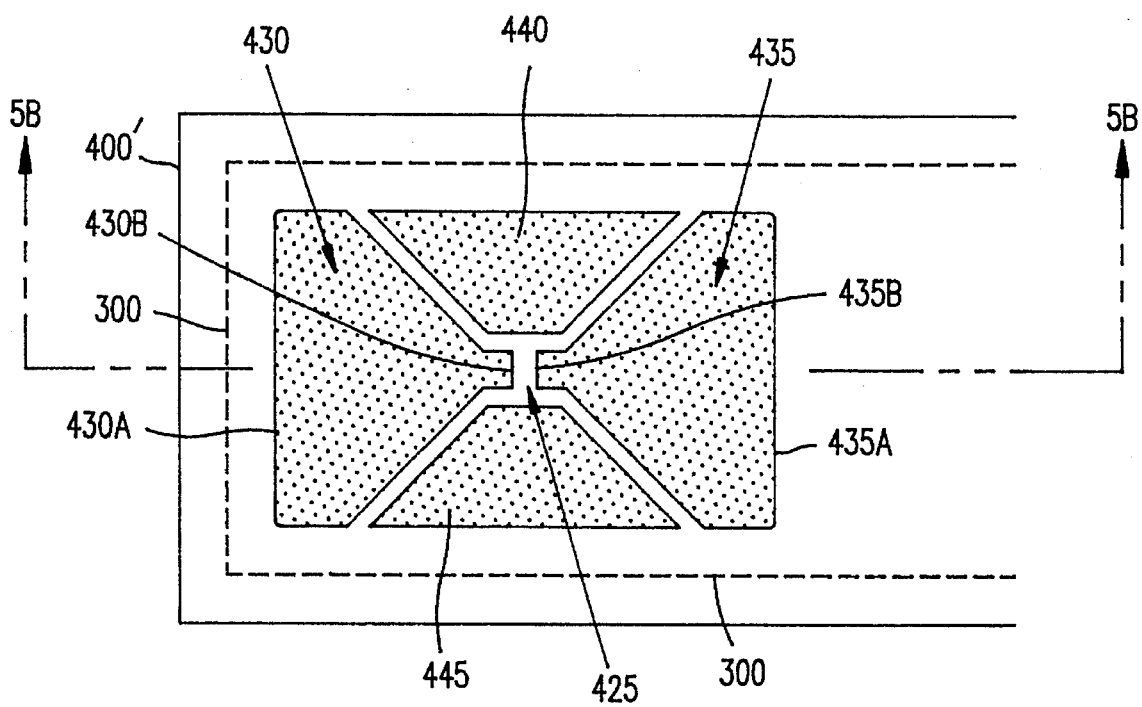
FIG. 5A is a top plan view of the head of FIG. 4A after first and second magnetic poles have been deposited in the first and second pole wells.
Figure 5B:
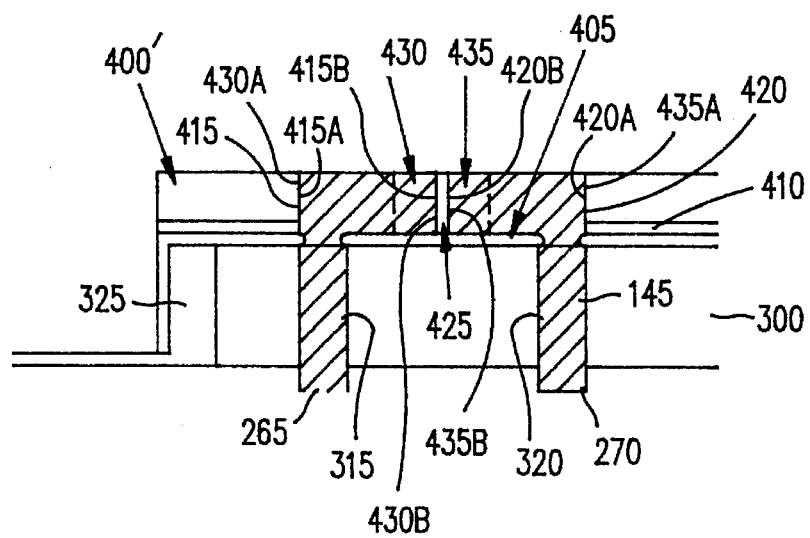
FIG. 5B is a cross-sectional view of the thin film head of FIG. 5A taking along section line 5B—5B.

A first magnetic pole 430 is plated in pole well 415 and atop side pole 265 to fill pole well 415 and the open region above side pole 265 up to a level even with the top of DLC layer 400' as shown in FIGS. 5A and 5B. First magnetic pole 430 is electrically and magnetically coupled to side pole 265. At the same time that first magnetic pole 430 is formed, a second magnetic pole 435 is plated in pole well 420 and atop side pole 270 to fill pole well 420 and the region above side pole 270 up to a level even with the top of DLC layer 400'. Second magnetic pole 435 is electrically and magnetically coupled to side pole 270. The narrow ends 430B and 435B of poles 430 and 435 are separated by DLC gap region 425 as illustrated in FIGS. 5A and 5B. With the plating of first magnetic pole 430 and second magnetic pole 435, the formation of magnetic yoke 145 is complete. Magnetic yoke 145 thus includes bottom magnetic layer 150, first side pole 265, second side pole 270, first magnetic pole 430 and second magnetic pole 435.

At the same time that first magnetic pole 430 and second magnetic pole 435 are plated, additional magnetic control layers 440 and 445 are plated in control wells 427 and 429, respectively. While optional, it has been found that plating additional magnetic control layers 440 and 445 at the same time as plating first magnetic pole 430 and second magnetic pole 435 serves to better control local plating current density. Such current density influences NiFe composition and enhances the effect of the easy axis magnetic orienting field. Magnetic yoke 145, first magnetic pole 430 and second magnetic pole 435 are all subjected to an easy axis magnetic orienting field of approximately 1000 Gauss to approximately 10,000 Gauss, provided by an external magnet, to give a desired magnetic domain structure in first magnetic pole 430 and second magnetic pole 435. It is noted that all plating of magnetic material in head 100 is conducted while the head is subjected to the magnetic orienting field.

DLC frame 400' is patterned with photoresist to protect yoke 145, namely magnetic poles 430 and 435, and to expose additional magnetic control layers 440 and 445. Magnetic control layers 440 and 445 are then etched away leaving control wells 427 and 429.

Figure 1:
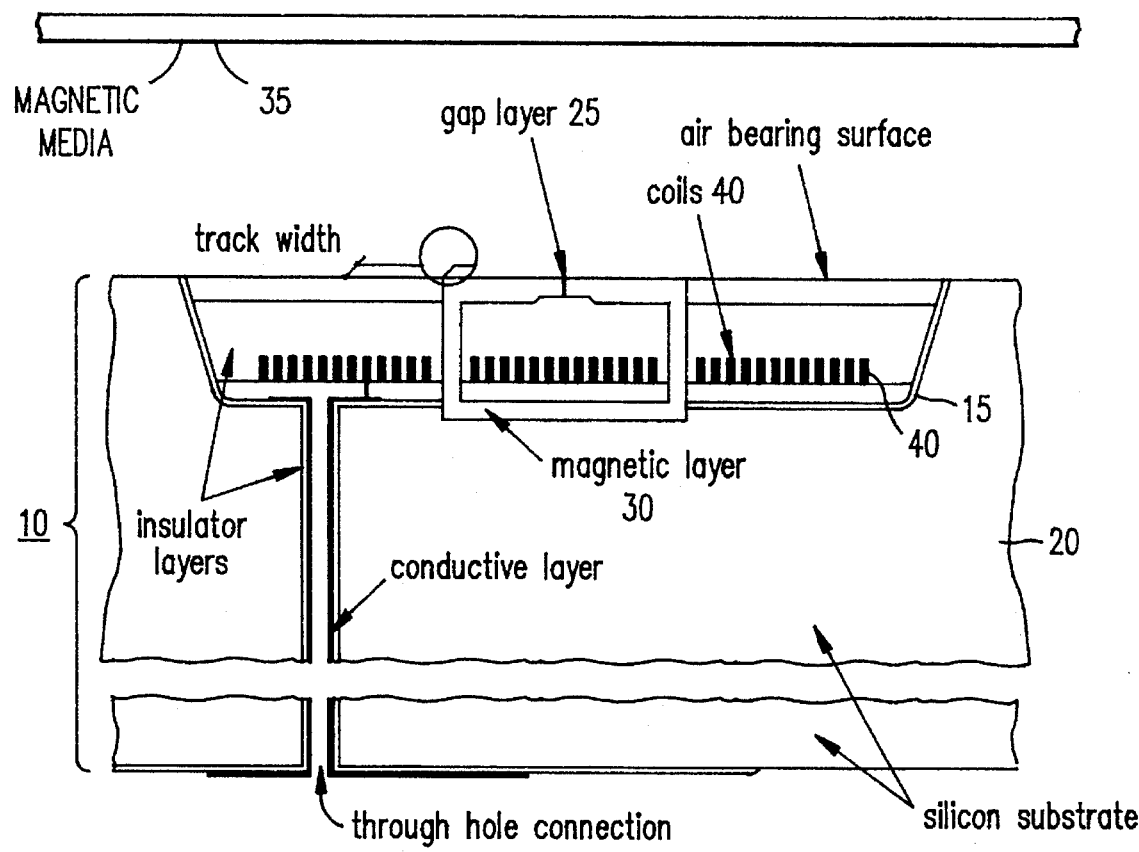
FIG. 1 is a cross section of a conventional thin film magnetic head.
Figure 6C:
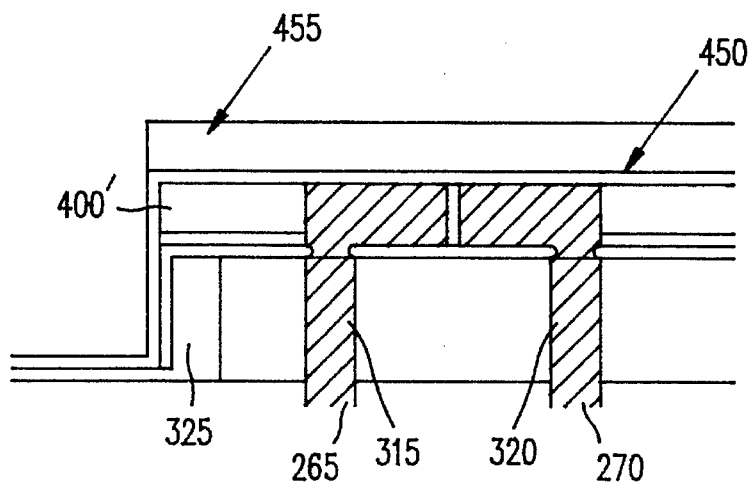
FIG. 6C is a cross-sectional view of the thin film head of FIG. 6B after the upper DLC layer is etched to substantially align with the lower DLC layer.
Figure 6A:
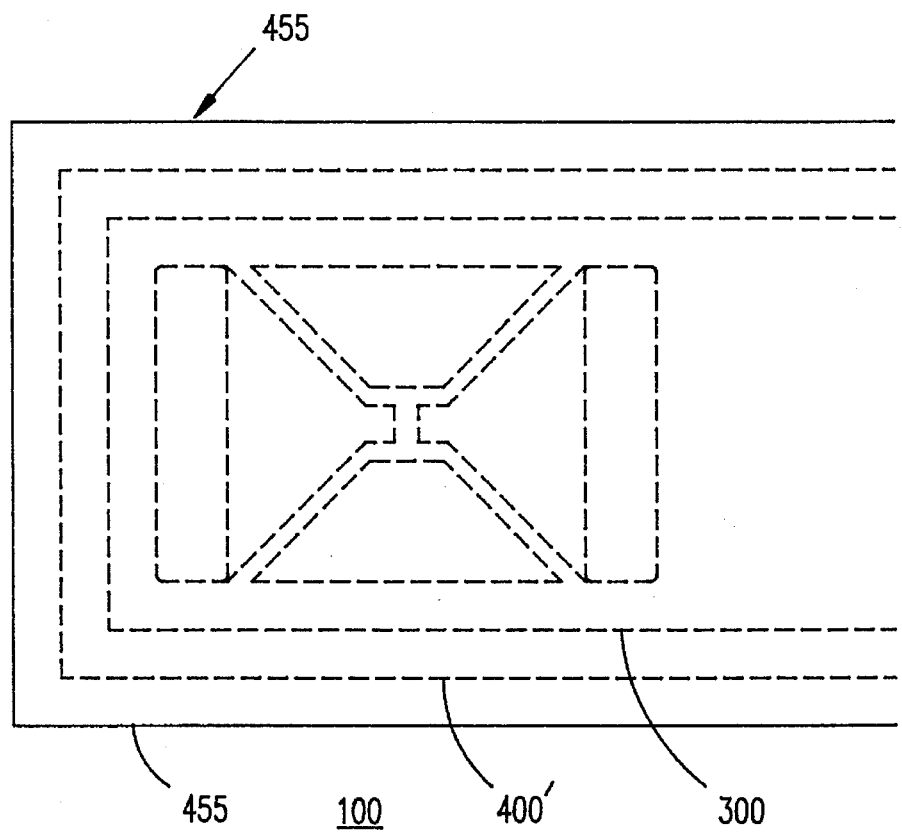
FIG. 6A is a top plan view of the head of FIG. 5A after an upper DLC layer has been deposited on the head.
Figure 6B:
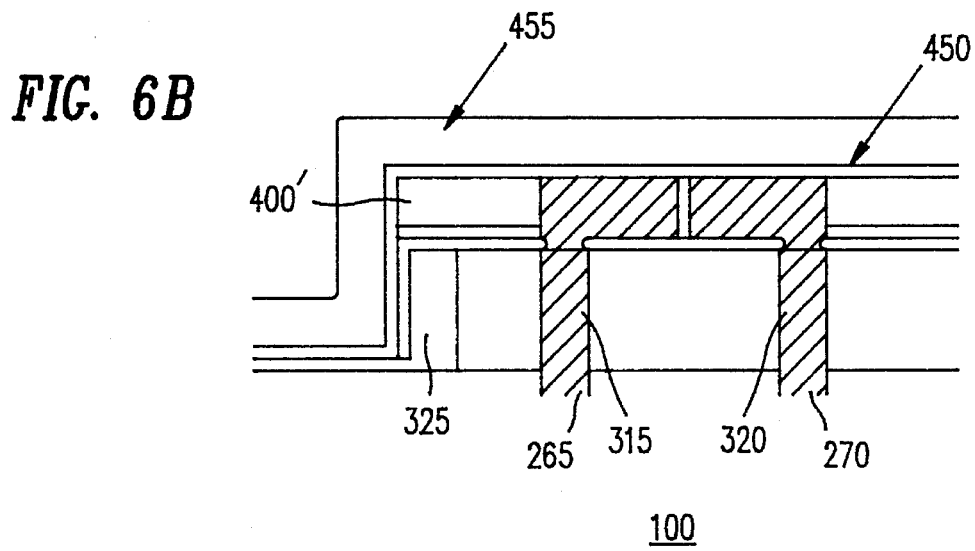
FIG. 6B is a cross-sectional view of the thin film head of FIG. 6A taking along section line 6B—6B.
Figure 7A:
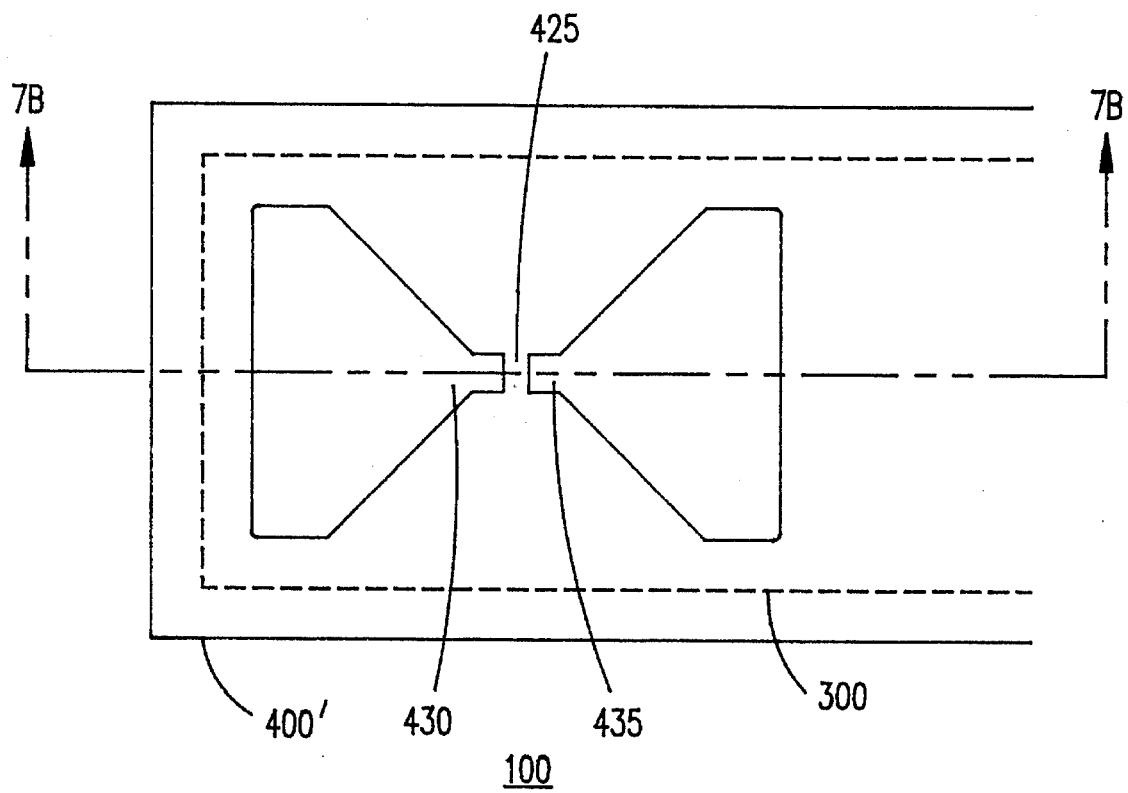
FIG. 7A is a top plan view of the head of FIG. 6C after the upper DLC layer is machined to expose the first and second magnetic poles and the DLC gap region between the poles.
Figure 7B:
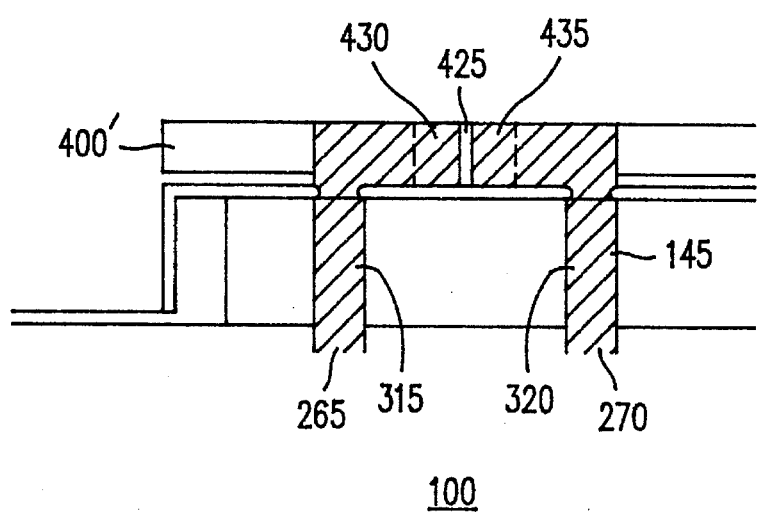
FIG. 7B is a cross-sectional view of the thin film head of FIG. 7A taking along section line 7B—7B.

A silicon adhesion layer 450 is deposited on the upper surface of head 100 of FIG. 5A as shown in FIG. 6B. Another DLC layer 455 equal in thickness to the depth of control wells 427 and 420 is then deposited on the exposed upper surface of head 100 of FIG. 6B using the process already described. Control wells 427 and 429 are thus again filled with DLC and the upper surface of head 100 of FIGS. 6A and 6B is covered with DLC. Silicon adhesion layer 450 enhances the adhesion of DLC layer 455 to the layers of head 10 below. DLC layer 455 is designated as an upper DLC layer and DLC layer 400 is designated as a lower DLC layer in this particular embodiment.

A thin masking layer of metal such as Chromium is sputtered over DLC layer 455 and photo patterned and etched to expose DLC areas to be reactive ion etched while protecting DLC wear layer frame 400' below. In other words, the exposed DLC layer 455 is reactive ion etched to achieve the head 100 structure of FIG. 6C. The upper surface of the head 100 structure of FIG. 6C is then machined to remove DLC layer 455 (except for the portions of layer 455 deposited in control wells 427 and 429) and to remove silicon adhesion layer 450. In other words, DLC layer 455 and silicon adhesion layer 450 are machined down to a sufficient depth to expose poles 430 and 435 of magnetic yoke 145 and gap region 425. The exposed poles 430 and 435 and gap region 425 form the head surface which is situated either touching or in close proximity with a magnetic recording media for playback or recording purposes.

A simplified embodiment of the invention is formed when the optional additional magnetic control layers 440 and 445 are omitted. In this embodiment, formation of control wells 427 and 429 is omitted when pole wells 415 and 420 are formed by etching DLC frame 400. First magnetic pole 430 and second magnetic pole 435 are plated in pole wells 415 and 420 as before, However, since there are no control wells 427 and 429 which require refilling with DLC, the step of depositing a second or upper DLC layer 455 is omitted. The upper surface of the head 100 thus formed is still machined to shape or contour gap region 425 and magnetic poles 430 and 435. In this particular embodiment, gap region 425 and magnetic poles 430 and 435 are provided with a substantially flat contour whereas other embodiments are possible wherein this contour is rounded or curved.

It is noted that top poles 430 and 435 are advantageously directly coupled to side poles 265 and 270, respectively, without the use of intermediate layers therebetween in one particular embodiment. Side poles 430 and 435 are simultaneously fabricated and are situated entirely in the same plane as the DLC wear layer 400' in one embodiment.

While a thin film magnetic head apparatus has been described above, it is clear that a method of fabricating such a magnetic head apparatus is also disclosed. Briefly, a method of fabricating a thin film magnetic head is provided which includes the step of forming a lower pole member of magnetic material on the substrate, the lower pole member including first and second ends. The method includes the step of forming first and second side pole members of magnetic material at the first and second ends, respectively, of the lower pole member. The first and second side pole members are built up from a plurality of layers of magnetic material deposited layer upon layer. The first and second side pole members include tops and bottoms. The method further includes the step of forming a conductor coil around one of the first and second side pole members while the first and second side pole members are being formed, the conductor coil being separated from the first and second side pole members by insulative layers. The method also includes the step of forming an insulative pedestal at the tops of the first and second side pole members, the insulative pedestal extending above the plane of the insulative layers below and surrounding the tops of the first and second side pole members. The method still further includes the step of depositing a first diamond-like carbon (DLC) layer on the insulative pedestal. The method also includes the step of excavating first and second pole wells in the DLC layer to expose the tops of the first and second side pole members, the first and second pole wells being laterally spaced apart to form a DLC gap region between the first and second pole wells. The method further includes the steps of forming first and second magnetic poles in the first and second pole wells, and machining the DLC layer down to shape the first and second magnetic poles and the DLC gap region.

The foregoing has described a thin film magnetic head in which head wear is significantly reduced. The disclosed head exhibits a narrow gap width within the range of approximately 0.5 micron to approximately 1 micron which results in correspondingly high density magnetic recording capabilities. Advantageously, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A thin film magnetic head comprising:

a substrate having a laterally-extending substantially-planar surface;

a first pole member of magnetic material extending laterally along the substrate surface from a first end surface to a second end surface;

a second pole member of magnetic material coupled to the first pole member adjacent to the first end surface and extending substantially perpendicular to the first pole member in a direction away from the substrate to form a surface;

a third pole member of magnetic material coupled to the first pole member adjacent to the second end surface and extending substantially perpendicular to the first pole member in a direction away from the substrate to form a surface, the second and third pole members being formed of a plurality of deposited magnetic material layers;

an insulative body enclosing the second and third pole members and extending from the first pole member in a direction away from the substrate to form a substantially planar surface with the second and third pole member surfaces, the insulative body being formed of a plurality of laterally-extending deposited layers of electrically insulative material;

a conductor coil contained within the insulative body, encircling one pole member of the second and third pole members;

a hard protective wear layer extending laterally along the insulative body, second pole member and third pole member surfaces, the hard protective wear layer including first and second pole wells which are open to the surfaces of the respective second and third pole members and extending laterally adjacent to a portion of the insulative body, the first and second pole wells being laterally separated by a hard gap region of the hard protective wear layer, and fourth and fifth magnetic pole members extending laterally within the respective first and second pole wells.

2. The thin film magnetic head of claim 1 wherein the hard protective wear layer is fabricated from a material that forms a hard protective wear layer having a Knoop hardness within the range of approximately 800 Knoop to approximately 2000 Knoop.

3. The thin film magnetic head of claim 1 wherein the hard protective wear layer is fabricated from diamond-like carbon (DLC).

4. The thin film magnetic head of claim 1 further comprising an electrically conductive seed layer extending laterally between the insulative body and the hard protective wear layer and having an aperture adjacent to the second pole member surface and an aperture adjacent to the third pole member surface.

5. The thin film magnetic head of claim 4 further comprising a silicon adhesion layer extending laterally between the seed layer and the hard protective wear layer for enhancing the adhesion of the hard protective wear layer to the insulative body.

6. A thin film magnetic head comprising:

a substrate having a laterally-extending substantially-planar surface;

a first pole member of magnetic material extending laterally along the substrate surface from a first end surface to a second end surface;

a second pole member of magnetic material coupled to the first pole member adjacent to the first end surface and extending substantially perpendicular to the first pole member in a direction away from the substrate to form a surface;

a third pole member of magnetic material coupled to the first pole member adjacent to the second end surface and extending substantially perpendicular to the first pole member in a direction away from the substrate to form a surface, the second and third pole members being formed of a plurality of deposited magnetic material layers;

an insulative body enclosing the second and third pole members and extending from the first pole member in a direction away from the substrate to form a substantially planar surface with the second and third pole member surfaces, the insulative body being formed of a plurality of laterally-extending deposited layers of electrically insulative material;

a conductor coil contained within the insulative body, encircling one pole member of the second and third pole members;

a diamond-like carbon (DLC) layer extending laterally along the insulative body, second pole member and third pole member surfaces, the DLC layer including first and second pole wells which are open to the surfaces of the respective second and third pole members and extending laterally adjacent to a portion of the insulative body, the first and second pole wells being laterally separated by a DLC gap region of the hard protective wear layer, and fourth and fifth magnetic pole members extending laterally within the respective first and second pole wells.

7. The thin film magnetic head of claim 6 further comprising an electrically conductive seed layer extending laterally between the insulative body and the DLC layer and having an aperture adjacent to the second pole member surface and an aperture adjacent to the third pole member surface.

8. The thin film magnetic head of claim 7 further comprising a silicon adhesion layer extending laterally between the seed layer and the DLC layer for enhancing the adhesion of the DLC layer to the insulative body.

9. A thin film magnetic head comprising:

a substrate having a substantially planar surface;

a quadrangular magnetic yoke having four substantially planar magnetic pole elements forming four sides of a quadrangle, a first of the planar magnetic pole elements being coupled to the substrate and coplanar with the substrate, a second and a third of the planar elements being coupled to the first planar magnetic pole element and arranged substantially perpendicular to the first planar magnetic pole element and a fourth magnetic pole element coupled to the second and third magnetic pole elements and arranged substantially perpendicular to the second and third magnetic pole elements;

an insulative body encasing the first, second and third magnetic pole elements and having a surface substantially coplanar with a surface of the fourth magnetic pole element;

a conductor coil contained within the insulative body and encircling one pole member of the second and third pole members; and a substantially planar hard protective wear layer being formed integral with the fourth magnetic pole element, the fourth magnetic pole element being separated by a gap region of the hard protective wear layer into two pole element portions.

10. A thin film magnetic head according to claim 9 wherein the hard protective wear layer is a first hard protective wear layer, the thin film head further comprising:

a second hard protective wear layer coupled to the first hard protective wear layer integral with the fourth magnetic pole element.

11. A thin film magnetic head according to claim 9 wherein the hard protective wear layer is fabricated from diamond-like carbon (DLC).

12. A thin film magnetic head according to claim 9 wherein the hard protective wear layer includes a first pole well for enclosing a first pole element portion and a second pole well for enclosing a second pole element portion.

\* \* \* \* \*